United States Patent
Buesching et al.

(12) 
(10) Patent No.: US 10,496,588 B2
(45) Date of Patent: Dec. 3, 2019

(54) METHOD FOR COUPLING A BUS SYSTEM OF AN AUTOMATION SYSTEM

(71) Applicant: WAGO Verwaltungsgesellschaft mbH, Minden (DE)

(72) Inventors: Dirk Buesching, Vlotho (DE); Detlef Brand, Minden (DE); Marcus Redeker, Loehne (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 15/928,912

(22) Filed: Mar. 22, 2018

(65) Prior Publication Data
US 2018/0276174 A1    Sep. 27, 2018

(30) Foreign Application Priority Data
Mar. 23, 2017    (DE) ........................ 10 2017 002 805

(51) Int. Cl.
*G06F 13/42* (2006.01)
*G06F 9/54* (2006.01)
*G06F 3/06* (2006.01)

(52) U.S. Cl.
CPC .......... *G06F 13/4265* (2013.01); *G06F 9/546* (2013.01)

(58) Field of Classification Search
None
See application file for complete search history.

(56) References Cited

U.S. PATENT DOCUMENTS

| 2006/0212604 | A1  | 9/2006  | Beckhoff et al. |
| 2010/0211711 | A1  | 8/2010  | Kuschke et al. |
| 2014/0369179 | A1  | 12/2014 | Ueda et al. |
| 2015/0365252 | A1* | 12/2015 | Bunte ................ H04L 12/6418 709/208 |
| 2018/0013582 | A1* | 1/2018  | Sotriffer ............ H04L 12/40169 |

FOREIGN PATENT DOCUMENTS

| EP | 1590927 B1 | 7/2006 |
| EP | 2274655 B1 | 8/2015 |

* cited by examiner

*Primary Examiner* — Scott C Sun
(74) *Attorney, Agent, or Firm* — Muncy, Geissler, Olds & Lowe, P.C.

(57) ABSTRACT

A method for operating a bus system of an automation system, wherein the bus system has an Ethernet-based network and a coupler and a local bus and a local bus user. An Ethernet telegram is received via the Ethernet-based network at the coupler, wherein the Ethernet telegram has an identifier associated with a fieldbus protocol wherein the Ethernet telegram has process data, conforming to the fieldbus protocol, for the local bus user. The process data is acquired and the identifier from the Ethernet telegram by the coupler. A local bus telegram is generated by the coupler, wherein the local bus telegram has a local-bus-specific local bus header and a local bus payload section. The process data is inserted, together with the identifier, into the local bus telegram by the coupler. The local bus telegram is transmitted from the coupler to the local bus user.

13 Claims, 5 Drawing Sheets

METHOD FOR COUPLING A BUS SYSTEM OF AN AUTOMATION SYSTEM

This nonprovisional application claims priority under 35 U.S.C. § 119(a) to German Patent Application No. 10 2017 002 805.2, which was filed in Germany on Mar. 23, 2017, and which is herein incorporated by reference.

BACKGROUND OF THE INVENTION

Field of the Invention

The present invention relates to a method for operating a bus system of an automation system.

Description of the Background Art

A fieldbus is bus system that connects field devices in a plant such as sensing elements (sensors) and actuators for the purpose of communicating with an automation device. There are standardized protocols for the communication. Many different fieldbus systems with different properties have become established on the market. Since 1999, fieldbuses have been standardized in IEC standard 61158 (Digital data communication for measurement and control—Fieldbus for use in industrial control systems). The current fieldbus technology generation is based on real-time Ethernet. Known fieldbuses are, for example, EtherNet/IP, SERCOS III, PROFINET, or EtherCAT.

In computer technology and telecommunications, a physical interface PHY (PHYsical layer) is a circuit that is responsible for encoding and decoding data between a purely digital circuit and a modulated analog system, for example, a transmission over the twisted pair cable. A physical interface is implemented, for example, in a fieldbus user and is used for communication via the fieldbus. The physical interface in this case is used for digital access to the modulated channel (cable).

EP 1 590 927 B1, which corresponds to U.S. Pat. No. 7,852,857, discloses a coupler for a ring topology network and an Ethernet-based network (fieldbus). If the transmission physics of the Ethernet network differs from that of the ring-type transmission path, a processing device is necessary in the coupler to convert an Ethernet telegram from the transmission physics of the Ethernet network to that of the ring-type transmission path. This processing unit is arranged between the external interface and the internal interface of the coupler. Furthermore, the processing unit may make necessary changes to the Ethernet telegram in order to guarantee the Ethernet standard for modified Ethernet telegrams output on the transmission path, for example, by interchanging the source and destination address and recalculating an Ethernet checksum.

EP 2 274 655 B1, which corresponds to US 2010/0211711, discloses a method and a bus coupler for exchanging data between a higher-level network and a lower-level network. The bus coupler has an external interface for connecting to an external network (higher-level bus system) via which network-specific telegrams can be transmitted. The bus coupler has an internal interface for connecting multiple bus users in series to a ring-shaped transmission path of a lower-level bus system. The bus coupler has a converter device, which is designed such that it can convert a network-specific telegram, received via the external interface, to an internal data telegram for transmission via the ring-shaped transmission path. The data telegram in this case contains no control data of the network-specific telegram. The converter device extracts the Ethernet header contained in the control data from each received Ethernet telegram and writes only the payload data transmitted in the data field into a data field of the internal data telegram. The Ethernet telegrams are converted into internal data telegrams of equal length. The data telegrams are transferred via the transmitter unit of the bus coupler to the lower-level bus system and transmitted via the bus users back to the receiving device of the coupler.

SUMMARY OF THE INVENTION

It is therefore an object of the present invention to provide a method that has greater flexibility.

Accordingly, in an exemplary embodiment, a method for operating a bus system of an automation system is provided. The bus system comprises an Ethernet-based network and a coupler and a local bus and a local bus user. The automation system is used to control a process. The automation system has, for example, a PLC (Programmable Logic Controller). The PLC is advantageously connected via the Ethernet-based network (fieldbus) to multiple devices for controlling the process. The coupler connects the Ethernet-based network to the local bus.

In a step of the method, an Ethernet telegram is received via the Ethernet-based network at the coupler. The Ethernet telegram has an identifier associated with a fieldbus protocol. The Ethernet telegram has process data, conforming to the fieldbus protocol, for the local bus user. Process data in this case are data that belong to a process that is controlled by the automation system. The process data in this case are advantageously at least part of the payload data transmitted in a payload section (payload) of the Ethernet telegram. The process data are thereby advantageously embedded within a fieldbus data packet according to the fieldbus protocol. The fieldbus protocol specifies the format of the process data, for example, their position within the fieldbus data packet.

An Ethernet telegram can be understood in the context of at least one Ethernet telegram, so that the coupler can receive one Ethernet telegram or a number of Ethernet telegrams in succession. An identifier can be understood in the context of at least one identifier, so that exactly one or more identifiers in different Ethernet telegrams can be received at the coupler.

The process data and the identifier can be acquired from the Ethernet telegram by the coupler. The identifier in this case is acquired from a header of the Ethernet telegram. The identifier is thus part of the control data of the Ethernet telegram. The process data are acquired by the coupler from a payload section of the Ethernet telegram. The payload section is also referred to as payload. The received process data can be associated with one or more local bus users. Accordingly, the received process data should be forwarded to local bus users via the local bus. The acquisition of the identifier and/or process data takes place, for example, by breaking down the Ethernet telegram into its data sections and copying the required data sections.

A local bus telegram can be generated by the coupler. In this case, the local bus telegram has a local-bus-specific local bus header and a local bus payload section. A local bus telegram in this case can be understood in the context of at least one local bus telegram, so that the coupler can generate one or preferably successively multiple local bus telegrams. Advantageously, a local bus protocol used with the local bus telegram differs from each fieldbus protocol used on the Ethernet-based network. For example, the local bus telegram can be shorter than the Ethernet telegram. In this case, the local bus is not Ethernet-based.

The process data together with the identifier are inserted into the local bus telegram by the coupler. Preferably, the process data can be inserted into the local bus payload section of the local bus telegram. The identifier is advantageously inserted into the local bus payload section or into the local bus header of the same local bus telegram.

The local bus telegram can be transmitted from the coupler to a local bus user via the local bus. A local bus user in this case is to be understood in the context of at least one local bus user, so that the coupler can be connected to exactly one or more local bus users via the local bus. If multiple local bus users are connected to the local bus, the at least one local bus telegram is advantageously transmitted to each transmission-active local bus user. In the case of a ring-shaped structure of the local bus, the local bus telegram can be transmitted successively to each transmission-active local bus user in the ring structure.

The identifier of the transmitted local bus telegram can be evaluated by the local bus user. If multiple local bus users are connected to the local bus, the identifier in the local bus telegram is advantageously transmitted to each transmission-active local bus user and evaluated by each transmission-active local bus user.

The process data can be used by the local bus user if the identifier matches a comparison identifier stored for the local bus user. Advantageously, the process data are discarded if the identifier does not match any comparison identifier stored for the local bus user. Advantageously, the stored comparison identifier has the same format as the identifier, so that a bitwise comparison can be performed. As an alternative to external storage, the comparison identifier can be stored in the local bus user itself, for example, in a semiconductor memory.

The identifier of the transmitted local bus telegram can be evaluated by the local bus user. In this case, the process data can be used by means of a first evaluation rule by the local bus user if the identifier matches a first comparison identifier stored for the local bus user. In contrast, the process data are used by means of a second evaluation rule by the local bus user if the identifier matches a second comparison identifier stored for the local bus user. For example, the first comparison identifier and the second comparison identifier can be different. For example, the first evaluation rule and the second evaluation rule can be different. Each evaluation rule in this case can be associated with a function of the local bus user. For example, by means of the evaluation rule, an output of the local bus user can be controlled based on the process data in order to control, for example, an actuator for the process.

The identifier of the received Ethernet telegram can be evaluated by the coupler. Advantageously, the identifier is changed by the coupler, in particular compressed. For compression, the bit number of the identifier is advantageously shortened. For example, if four fieldbus protocols are used in an Ethernet-based network, the associated four Ethernet type values each with sixteen bits can be mapped to two bits. Advantageously, the identifier is inserted in modified, in particular compressed form, together with the process data into the local bus telegram by the coupler. For example, only the format of the identifier but not the information content of the identifier is altered by the change.

Further process data can be generated by the coupler in addition to the process data received via the Ethernet-based network. Advantageously, the coupler also generates the identifier, which in this case belongs to the generated process data. Advantageously, a further local bus telegram is generated by the coupler. Advantageously, the further process data are inserted together with the identifier into the further local bus telegram by the coupler. Advantageously, the further local bus telegram is transmitted from the coupler to the local bus user. For example, the further local bus telegram can be transmitted if there is no local bus telegram with process data acquired from the Ethernet telegram.

The further local bus telegram can be received by the local bus user. Advantageously, the identifier is evaluated by the local bus user after the receipt. Advantageously, the further process data are evaluated by means of a further evaluation rule by the local bus user if the identifier matches a further comparison identifier stored for the local bus user. In this case, the further evaluation rule differs from each fieldbus-specific evaluation rule. Likewise, the further comparison identifier differs from each fieldbus-specific comparison identifier.

According to an embodiment, when the identifier is inserted into the local bus telegram by the coupler, the identifier precedes the process data in the local bus telegram. For example, the identifier can be prefixed immediately adjacent to the process data. This allows the process data to be used without caching even when the process data with the correct evaluation rule are input.

The process data can be inserted into the local bus payload section of the local bus telegram. The identifier can also be inserted into the local bus payload section of the local bus telegram by the coupler. Although it is fundamentally possible to insert the identifier after the process data in the local bus payload section, the identifier may be inserted in front of the process data in the local bus payload section. According to an embodiment, the process data can be inserted into the local bus payload section and the identifier is inserted into the local-bus-specific local bus header of the local bus telegram by the coupler. As a result, the local bus header of the local bus telegram can be better utilized.

An aspect of the invention in addition is a bus system for an automation system. The bus system comprises an Ethernet-based network and a coupler and a local bus and a local bus user. The coupler is configured: to receive an Ethernet telegram via the Ethernet-based network, wherein the Ethernet telegram has an identifier associated with a fieldbus protocol, wherein the Ethernet telegram has process data, conforming to the fieldbus protocol, for the local bus user; to acquire the process data and the identifier from the Ethernet telegram; to generate a local bus telegram, wherein the local bus telegram has a local-bus-specific local bus header and a local bus payload section; to insert the process data together with the identifier into the local bus telegram; and/or to transmit the local bus telegram to the local bus user.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
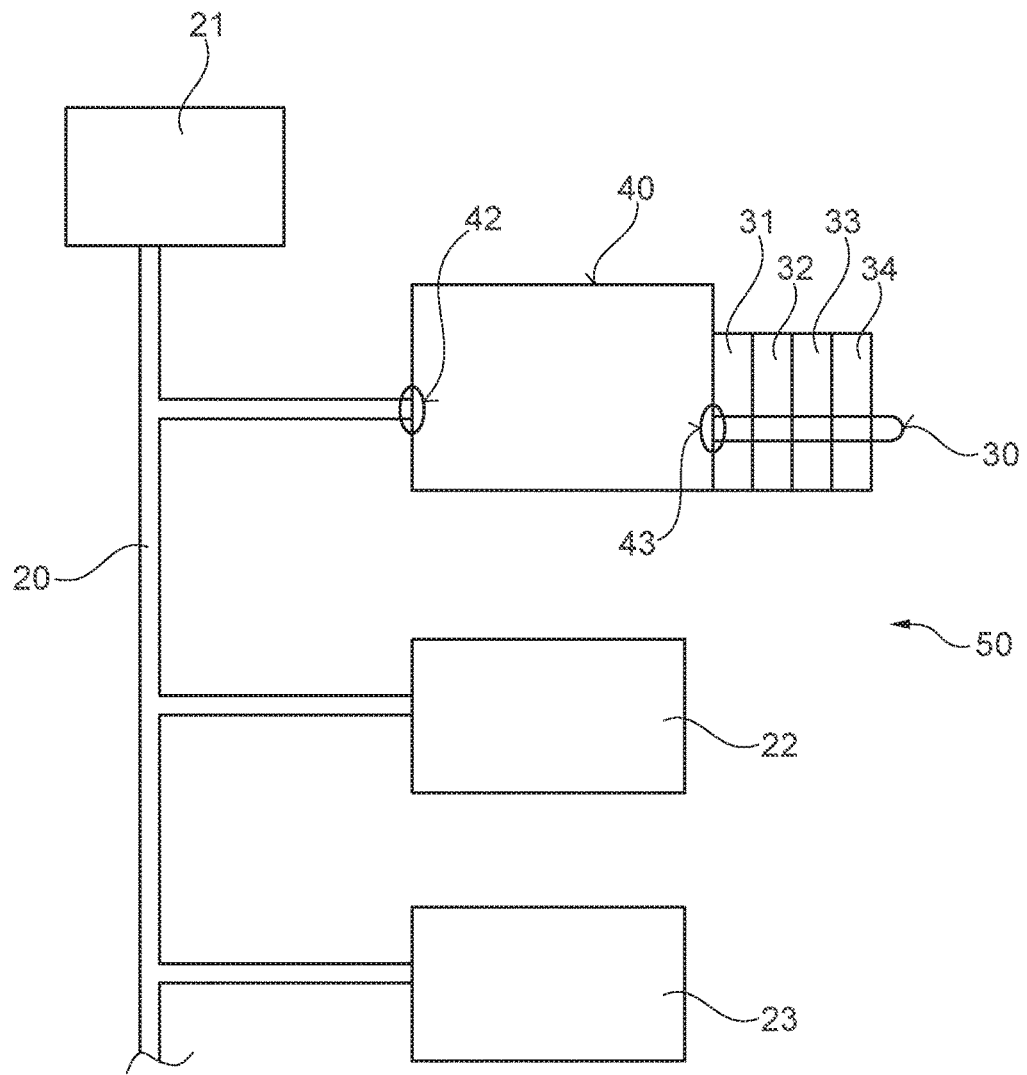
FIG. 1 is a schematic block diagram of an exemplary embodiment of an automation system with a coupler.

FIG. 1 shows a schematic block diagram of an automation system 50. Automation system 50 has an Ethernet-based network 20 as a fieldbus to which a coupler 40 is connected. The Ethernet-based network 20 may be designed, for example, as an EtherCAT fieldbus or PROFINET fieldbus. The physical transmission medium can be a twisted pair cable with RJ45 plugs/sockets. For a low cabling effort, devices 21, 40, 22, 23 connected to Ethernet-based network 20 can be connected in line. However, Ethernet-based network 20 may also have any other suitable topology. Ethernet-based network 20 is designed to transmit Ethernet telegrams for communication of users 40, 21, 22, 23 with one another. In the exemplary embodiment of FIG. 1, a PLC 21 is connected to Ethernet-based network 20, wherein PLC 21 communicates with nodes 40, 22, 23 in automation system 50 via Ethernet-based network 20. PLC 21 may be configured, for example, as a control center.

In the exemplary embodiment of FIG. 1, a coupler 40 is shown, which is connected to Ethernet-based network 20 and to a local bus 30. A local bus 30 is to be understood here as a bus that is separate from Ethernet-based network 20. In the exemplary embodiment of FIG. 1, local bus 30 has a different transmission type from Ethernet-based network 20. In the exemplary embodiment of FIG. 1, the protocols used on Ethernet-based network 20 and local bus 30 differ. Also, the transmission physics of Ethernet-based network 20 and that of local bus 30 may differ. In the exemplary embodiment of FIG. 1, devices 21, 22, 23 communicate with local bus users 31, 32, 33, 34 exclusively via coupler 40. Coupler 40 may also be referred to as a bus coupler. Local bus users 31, 32, 33, 34 can be located remotely from each other and from coupler 40. Advantageously, however, local bus users 31, 32, 33, 34 are located in the immediate vicinity of coupler 40. Local bus users 31, 32, 33, 34 can have a mechanical attachment for fixation to one another and in particular to coupler 40. A compact unit can be created in this way.

In the exemplary embodiment of FIG. 1, local bus users 31, 32, 33, 34 have a low bandwidth, so that only a small amount of data is written or read. Therefore, a common Ethernet telegram, which supplies local bus users 31, 32, 33, 34 with process data, is used for the data of local bus users 31, 32, 33, 34. Coupler 40 has a network interface 42 for connection to Ethernet-based network 20. An Ethernet telegram with the process data of the process can be received via network interface 42. Furthermore, coupler 40 has a local bus interface 43 for connection to local bus 30. A local bus telegram can be transmitted via local bus interface 43. Coupler 40 thus acts as a link between Ethernet-based network 20 and local bus 30. In the exemplary embodiment of FIG. 1, coupler 40 in the local bus system is configured as a master and the other local bus users 31, 32, 33, 34 are configured as slaves.

In the design of the exemplary embodiment of FIG. 1, Ethernet-based network 20 may also be referred to as a higher-level or overlay bus and local bus 30 as a lower-level or subordinate bus. Advantageously, local bus 30 is configured as a logical ring bus structure, wherein a local bus telegram passes through local bus users 31, 32, 33, 34 sequentially in the downstream direction (downstream) and/or upstream direction (upstream) and then returns back to coupler 40.

Network interface 42 of coupler 10 has contacts, in the exemplary embodiment of FIG. 1, for example, a socket for connection to Ethernet-based network 20. In addition, network interface 42 may include an interface circuit (e.g., a transceiver TRX) for communication. Local bus interface 43 of coupler 40 has contacts for connection to local bus 30. In addition, in the exemplary embodiment of FIG. 1, local bus interface 43 has an interface circuit for transmitting and receiving local bus telegrams via local bus 30. Due to the transmission physics of Ethernet-based network 20 and local bus 30, transmission physics which are different in the exemplary embodiment of FIG. 1, coupler 40 can be configured to convert the Ethernet telegram from the transmission physics of Ethernet-based network 20 to the transmission physics of local bus 30. In the exemplary embodiment of FIG. 1, local bus interface 43 has a connection mechanism, e.g., in the form of metallic contacts.

In the exemplary embodiment of FIG. 1, Ethernet telegrams can be transmitted via Ethernet network 20, wherein fieldbus packets with a different protocol, for example, for PROFINET or EtherCAT, can be contained in different payload sections/payloads of multiple Ethernet telegrams. In the exemplary embodiment of FIG. 1, coupler 40 is configured to transmit process data for different fieldbus protocols on local bus 30.

In the exemplary embodiment of FIG. 1, coupler 40 is configured to receive an Ethernet telegram via Ethernet-based network 20. The Ethernet telegram has an identifier. The identifier is associated with a fieldbus protocol. The Ethernet telegram has process data, conforming to the fieldbus protocol, for local bus user 31, 32, 33, 34. The coupler is configured to acquire the process data and the identifier from the Ethernet telegram. In addition, coupler 40 in the exemplary embodiment of FIG. 1 is configured to generate a local bus telegram, wherein the local bus telegram has a local-bus-specific local bus header and a local bus payload section. Advantageously, coupler 40 is configured to transmit via local bus interface 43 the process data of the process to one or more local bus users 31, 32, 33, 34, connected to local bus 30, and/or to receive process data from at least one local bus user 31, 32, 33, 34. Coupler 40 is further configured to insert the process data together with the identifier into the local bus telegram and to transmit the local bus telegram with process data and identifier to the local bus user or users 31, 32, 33, 34. To carry out the above-described functions, coupler 40 can have has an electrical circuit.

Figure 2:
FIG. 2 is a schematic list with an identifier.

FIG. 2 schematically shows a list with an identifier ET and associated fieldbus protocol P according to an exemplary embodiment. For example, the EtherType with the value 0x88A4 is shown for identifier ET. In order to reduce a bit number for the identifier ET, in the exemplary embodiment of FIG. 2, the identifier ET' is additionally shown after a modification. In the exemplary embodiment of FIG. 2, the modified identifier ET' has only four bits compared with the EtherType with sixteen bits. With the compression to the four bit identifier ET', sixteen possible fieldbus protocols P can still be differentiated. The skilled artisan is aware that, depending on the number of fieldbus protocols P used, the identifier ET can also be compressed such that only one or two bits must be transmitted as identifier ET' via local bus 30.

Figure 3:
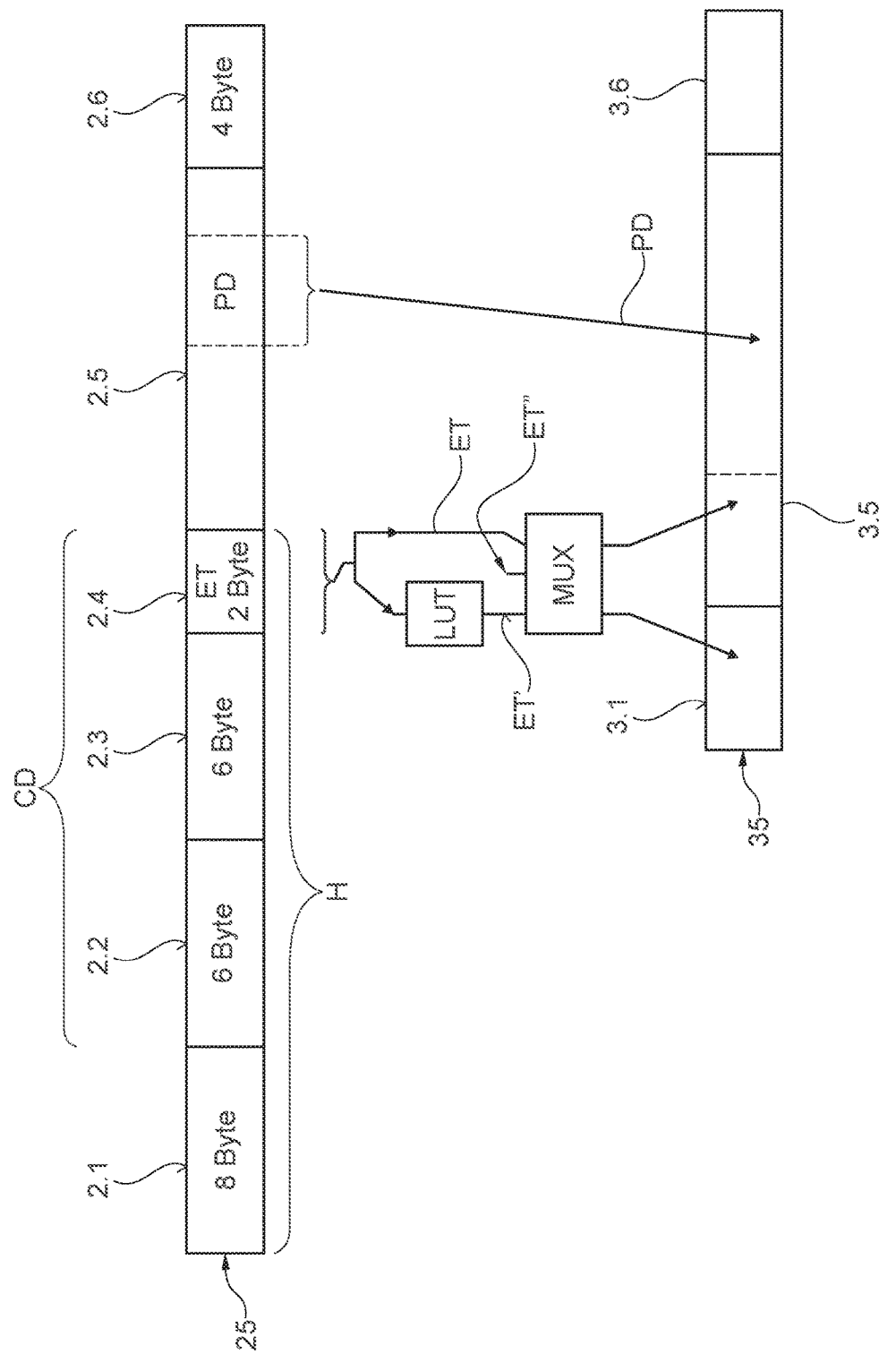
FIG. 3 is a schematic diagram of an exemplary embodiment with an Ethernet telegram and a local bus telegram.

FIG. 3 shows a schematic diagram which schematically shows an Ethernet telegram 25 and a local bus telegram 35. Ethernet telegram 25 of the exemplary embodiment of FIG. 3 has a header H, a payload section (payload) 2.5 with process data PD, and a trailer 2.6. Trailer 2.6 may contain check values (CRC), for example. The received process data PD are individual data for multiple local bus users 31, 32, 33, 34 (shown, inter alia, in the exemplary embodiment of FIG. 1). The header H of Ethernet telegram 25 has control data CD and, for example, a field 2.1 for a preamble. In the present exemplary embodiment of FIG. 3, preamble 2.1 is eight bytes long. In the exemplary embodiment of FIG. 3, a number of fields, the so-called destination MAC 2.2, the so-called source MAC 2.3, and EtherType 2.4, are provided in Ethernet telegram 25 for the control data CD. The EtherType is an identifier ET, which is associated with a fieldbus protocol P in an automation system 50 as explained in FIG. 2. The identifier ET is a 2-byte-long type of Ethernet telegram—EtherType.

The process data PD intended for local bus users 31, 32, 33, 34 are extracted from Ethernet telegram 25 by coupler 40. The extracted process data PD are then inserted changed or unchanged into local bus telegram 35. In addition, the coupler is configured to acquire the identifier ET from the header H of Ethernet telegram 25 preceding a payload section 2.5.

A local bus telegram 35 is also shown schematically in FIG. 3. Local bus telegram 35 has a local bus header 3.1 and a local-bus-specific local bus payload section (payload) 3.5 and a trailer 3.6. Trailer 3.6 can contain a check value (CRC), for example. The process data PD are inserted into payload section 3.5 of local bus telegram 35. Each local bus user 31, 32, 33, 34 is configured to extract the individual (process) data associated with it from local bus telegram 35 (summation frame protocol).

Different variants for inserting identifier ET, ET', ET" into local bus telegram 35 are shown in the illustration of FIG. 3. This is shown schematically by the functions of the lookup table (LUT—LookUp Table) and the multiplexer MUX. In a first exemplary embodiment, the identifier ET is acquired from Ethernet telegram 25 and inserted unchanged as identifier ET into header 3.1 of local bus telegram 35. In a second exemplary embodiment, identifier ET is acquired from Ethernet telegram 25 and inserted unchanged as identifier ET into payload section 3.5 of local bus telegram 35. In a third embodiment, identifier ET is acquired from Ethernet telegram 25 and modified by means of the lookup table LUT, for example, reformatted, and inserted as a modified identifier ET' into header 3.1 of local bus telegram 35. In a fourth embodiment, identifier ET is acquired from Ethernet telegram 25 and modified by means of the lookup table LUT, for example, compressed, and inserted as a modified identifier ET' into payload section 3.5 of local bus telegram 35. In a fifth exemplary embodiment, identifier ET" is generated by the coupler itself, wherein the generated identifier ET" is associated with the process data generated by coupler 40. Identifier ET" generated by coupler 40 is inserted into header 3.1 of local bus telegram 35. In a sixth exemplary embodiment, identifier ET" generated by coupler 40 is inserted into payload section 3.5 of local bus telegram 35. The skilled artisan is aware that significantly more complex local bus telegrams 35 can also be provided.

Figure 4:
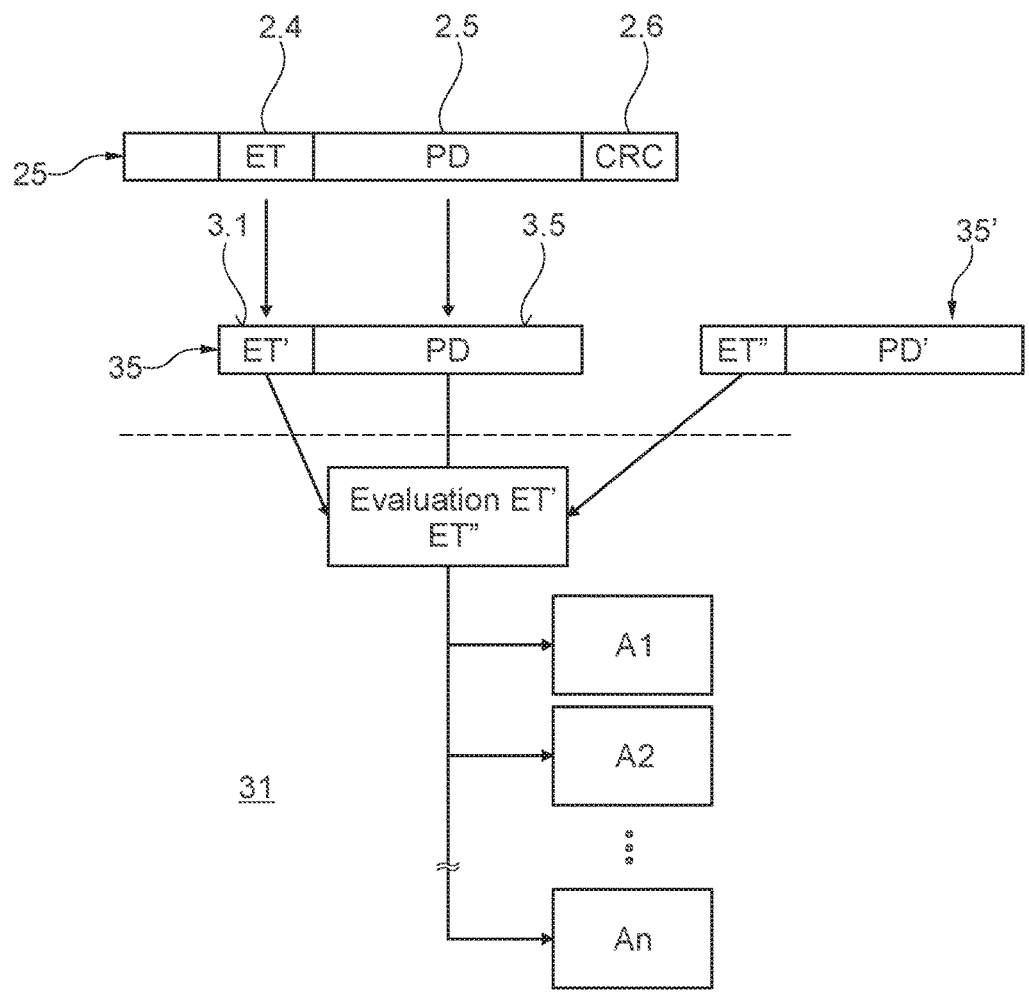
FIG. 4 is a schematic diagram of an exemplary embodiment with an Ethernet telegram and a local bus telegram.

A view of an exemplary embodiment is shown schematically in FIG. 4. Shown are an Ethernet telegram 25 and two local bus telegrams 35, 35'. In this case, one of local bus telegrams 35 was generated based on Ethernet telegram 25, whereas the other local bus telegram 35' was generated by coupler 40, but independently of Ethernet telegram 25. The functions of a local bus user 31 are shown schematically below the dashed line, wherein local bus user 31 receives both local bus telegrams 35, 35' successively. The respective identifier ET', ET" of the respective local bus telegram 35, 35' is evaluated by means of an evaluation function. Of course, it is clear to the skilled artisan that, moreover, a plurality of further local bus telegrams can also be transmitted in a local bus 30.

Local bus user 31 is configured to receive local bus telegram 35 and further local bus telegram 35' via local bus 30. Local bus user 31 of the exemplary embodiment of FIG. 4 is configured to evaluate the respective identifier ET', ET" of local bus telegram 35 and of the further local bus telegram 35'. In order to evaluate the process data PD and further process data PD', the local bus user performs a case differentiation: Local bus user 31 is configured to use the process data PD by means of a first evaluation rule A1 if identifier ET' matches a first comparison identifier stored for local bus user 31. By means of the first evaluation rule, the process data are used, for example, to control an actuator within the overall process in accordance with the process; and/or Local bus user 31 is configured to use the further process data PD' by means of a further evaluation instruction An, if identifier ET" matches a further comparison identifier stored for local bus user 31. By means of the further evaluation rule, the further process data are used, for example, to control an actuator outside of the overall process in a test mode.

It is shown in addition in the exemplary embodiment of FIG. 4 that a second evaluation rule A2 is provided, e.g., for process data of another fieldbus protocol. The skilled artisan is aware that, in view of a larger number of fieldbus protocols used, a number of evaluation instructions A1, A2, An, etc., adapted to the needs of automation system 50 can also be provided. This is indicated accordingly in FIG. 4. In this case, the first, second, and any further evaluation rules A1, A2, An differ from each other. Similarly, the comparison identifiers are different.

Figure 5:
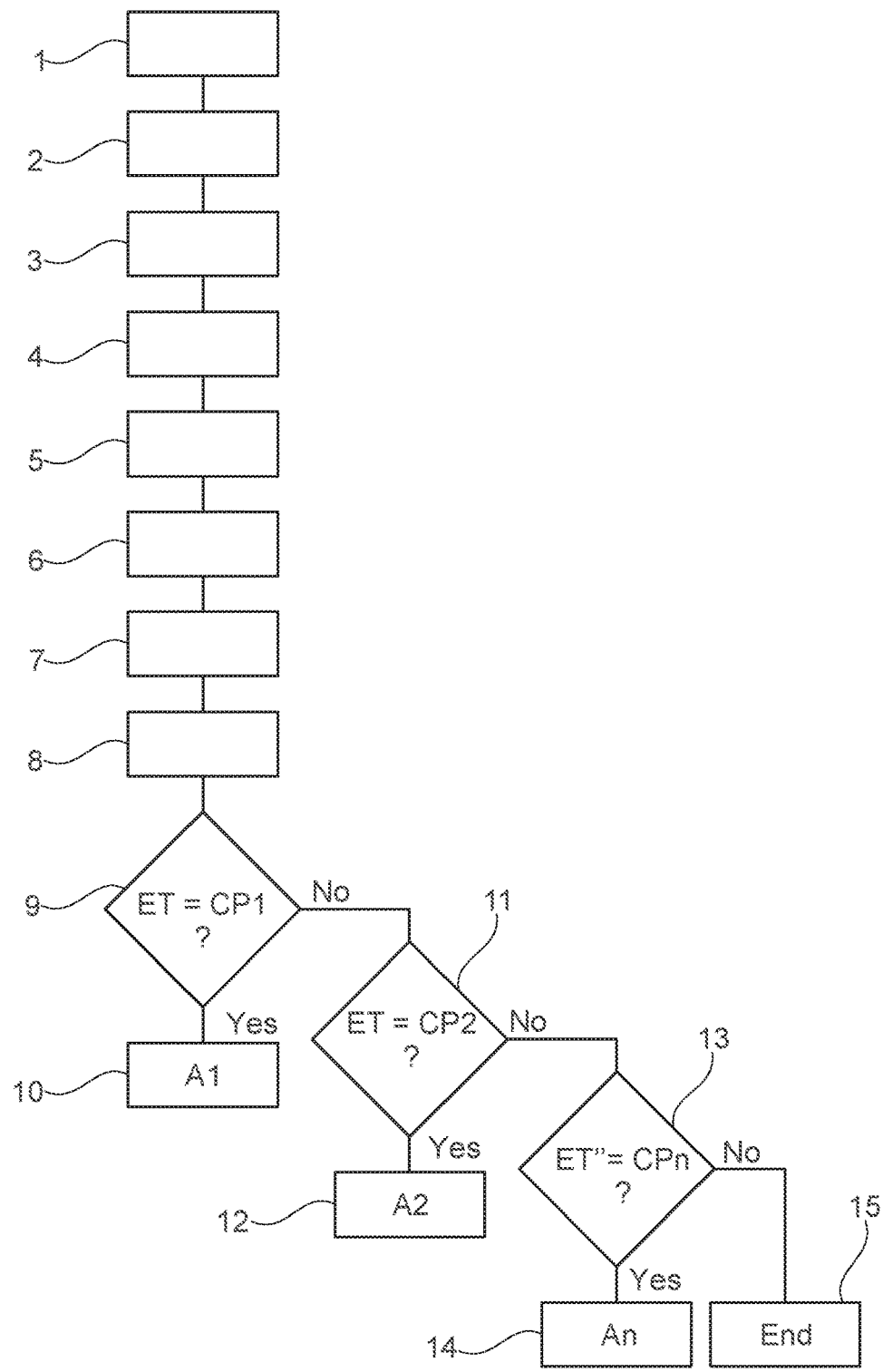
FIG. 5 is a schematic flowchart.

FIG. 5 schematically shows a sequence of a method of an exemplary embodiment of the invention as a flowchart. The skilled artisan in this case is aware that further steps can be added in the flowchart or steps can be combined or steps can be omitted if these steps are not necessary for the automation system.

In a first step 1, an Ethernet telegram 25 is received via an Ethernet-based network 20 at a coupler 40. In the following step 2, process data PD and an identifier are acquired from the Ethernet telegram 25. Accordingly, Ethernet telegram 25 has the identifier ET. Identifier ET is associated with a fieldbus protocol P. Ethernet telegram 25 has the process data PD for one or more local bus users 31, 32, 33, 34. In this case, process data PD conform to the fieldbus protocol P. In a subsequent step 3, the identifier can be evaluated, for example, to control, for example, functions of coupler 40.

In a subsequent step 4, it is possible to change the format of the identifier ET. For example, the identifier may be changed to a format conforming to the local bus protocol. It is also possible to compress the identifier ET. In a subsequent step 5, a local bus telegram 35 is generated by coupler 40. Local bus telegram 35 may have a local-bus-specific local bus header 3.1 and a local bus payload section 3.5 in accordance with a local bus protocol. In a subsequent step 6, the process data PD together with the identifier ET, ET', ET" are inserted into local bus telegram 35 by coupler 40 and in the subsequent step 7 transmitted from coupler 40 via local bus 30 to one or more local bus users 31, 32, 33, 34.

In a subsequent step 8, the identifier ET, ET', ET" transmitted via local bus 30 is read in from local bus telegram 35 by local bus user 31, 32, 33, 34. In the subsequent steps 9, 11, 13, local bus user 31, 32, 33, 34 compares the identifier with one or more comparison identifiers CP1, CP2, CPn. In the positive comparison case, the associated evaluation rule A1, A2, An is carried out in one of the subsequent steps 10, 12, or 14 in order to process the received process data PD. In the negative comparison case, the process is ended in step 15. The skilled artisan is aware that for the same functionality, the sequence of the exemplary embodiment of FIG. 5 can be altered, supplemented, shortened, or modified; for example, the comparisons in steps 9, 11, and 13 can also be carried out concurrently.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a bus system of an automation system, the bus system comprising an Ethernet-based network and a coupler and a local ring bus and a local bus user, the method comprising:
   receiving an Ethernet telegram via the Ethernet-based network at the coupler, the Ethernet telegram having an identifier identifying a fieldbus protocol type, the Ethernet telegram having process data, conforming to the fieldbus protocol, for the local bus user;
   acquiring the process data and the identifier from the Ethernet telegram by the coupler;
   generating a local bus telegram by the coupler, the local bus telegram having a local-bus-specific local bus header and a local bus payload section;
   inserting the process data together with the identifier into the local bus telegram by the coupler; and
   transmitting the local bus telegram from the coupler to the local bus user,
   wherein the local bus protocol used with the local bus telegram differs from the fieldbus protocol used on the Ethernet-based network.

2. The method according to claim 1, further comprising:
   evaluating the identifier of the transmitted local bus telegram by the local bus user;
   using the process data by the local bus user if the identifier matches a comparison identifier stored for the local bus user; and
   discarding the process data if the identifier does not match any comparison identifier stored for the local bus user.

3. The method according to claim 1, further comprising:
   evaluating the identifier of the transmitted local bus telegram by the local bus user;
   using the process data via a first evaluation rule by the local bus user if the identifier matches a first comparison identifier stored for the local bus user; and
   using the process data via a second evaluation rule by the local bus user if the identifier matches a second comparison identifier stored for the local bus user,
   wherein the first comparison identifier and the second comparison identifier are different, and
   wherein the first evaluation rule and the second evaluation rule are different.

4. The method according to claim 1, further comprising:
   evaluating the identifier of the received Ethernet telegram by the coupler;
   changing the identifier by the coupler; and
   inserting the identifier in a modified or modified compressed form together with the process data into the local bus telegram by the coupler.

5. The method according to claim 1, further comprising:
   generating further process data by the coupler;
   generating a further identifier by the coupler;
   generating a further local bus telegram and inserting the further process data together with the further identifier into the further local bus telegram by the coupler; and
   transmitting the further local bus telegram from the coupler to the local bus user.

6. The method according to claim 5, further comprising:
   receiving the further local bus telegram by the local bus user;
   evaluating the further identifier by the local bus user; and
   using the further process data via a further evaluation rule by the local bus user if the further identifier matches a further comparison identifier stored for the local bus user,
   wherein the further evaluation rule differs from each of a plurality of fieldbus-specific evaluation rules, and
   wherein the further comparison identifier differs from each of a plurality of fieldbus-specific comparison identifiers.

7. The method according to claim 1, wherein, when the identifier is inserted into the local bus telegram, the identifier precedes the process data the local bus telegram.

8. The method according to claim 1, wherein the process data are inserted into the local bus payload section of the local bus telegram, and wherein the identifier is also inserted into the local bus payload section of the local bus telegram by the coupler.

9. The method according to claim 1, wherein the process data are inserted into the local bus payload section of the local bus telegram, and wherein the identifier is inserted into the local bus-specific local bus header of the local bus telegram by the coupler.

10. A bus system comprising:
    an Ethernet-based network;
    a coupler;
    a local bus; and
    a local bus user,
    wherein the coupler is configured
    to receive an Ethernet telegram via the Ethernet-based network, the Ethernet telegram having an identifier associated with a fieldbus protocol, the Ethernet telegram having process data conforming to the fieldbus protocol for the local bus user,
    to acquire the process data and the identifier from the Ethernet telegram,
    to generate a local bus telegram, the local bus telegram having a local-bus-specific local bus header and a local bus payload section,
    to insert the process data together with the identifier into the local bus telegram, and
    to transmit the local bus telegram to the local bus user,
    wherein the local bus protocol used with the local bus telegram differs from the fieldbus protocol used on the Ethernet-based network.

11. The method according to claim 1, wherein the coupler reformats the identifier for insertion into the local bus telegram using a look-up table to compress the identifier of the Ethernet-based network.

12. The method according to claim 1, wherein the coupler removes a cyclical redundancy check from data of the Ethernet telegram before insertion of the process data and the identifier into the local bus telegram.

13. The method according to claim 3, wherein each of the first evaluation rule and the second evaluation rule correspond to different fieldbus protocols.

* * * * *